US009798463B2

(12) United States Patent
Luo et al.

(10) Patent No.: US 9,798,463 B2
(45) Date of Patent: Oct. 24, 2017

(54) CHARACTER INPUT METHOD AND APPARATUS

(71) Applicant: TENCENT TECHNOLOGY (SHENZHEN) COMPANY LIMITED, Shenzhen (CN)

(72) Inventors: Gang Luo, Shenzhen (CN); Yanping Shen, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 204 days.

(21) Appl. No.: 14/585,748

(22) Filed: Dec. 30, 2014

(65) Prior Publication Data
US 2015/0116225 A1 Apr. 30, 2015

Related U.S. Application Data

(63) Continuation of application No. PCT/CN2013/078755, filed on Jul. 3, 2013.

(30) Foreign Application Priority Data

Jul. 5, 2012 (CN) .......................... 2012 1 0231671

(51) Int. Cl.
G06F 3/0488 (2013.01)
G06F 3/023 (2006.01)
G06F 21/36 (2013.01)

(52) U.S. Cl.
CPC .......... G06F 3/04886 (2013.01); G06F 3/023 (2013.01); G06F 3/0233 (2013.01); G06F 21/36 (2013.01)

(58) Field of Classification Search
CPC .... G06F 3/04886; G06F 3/0233; G06F 21/36; G06F 3/023
See application file for complete search history.

(56) References Cited

U.S. PATENT DOCUMENTS

2003/0119551 A1   6/2003  Laukkanen et al.
2005/0257147 A1*  11/2005 Brill ...................... G06F 17/273
                                                              715/257

(Continued)

FOREIGN PATENT DOCUMENTS

CN   1372182 A   10/2002
CN   1427326 A    7/2003

(Continued)

OTHER PUBLICATIONS

International Preliminary Report for Application No. PCT/CN2013/078755 dated Jan. 15, 2015.

(Continued)

*Primary Examiner* — Andrew Sasinowski
(74) *Attorney, Agent, or Firm* — Harness, Dickey & Pierce, P.L.C.

(57) ABSTRACT

Character input in which key press information input by a user is received. When the received key press information meets a preset enabling condition of the mapping mode, a mapping mode is entered into; key press information input by the user in the mapping mode is receive. A character string corresponding to the key press information input by the user in the mapping mode is searched according to a preset mapping relation between the character string and a keyboard, and the searched character string is sent to an application.

12 Claims, 12 Drawing Sheets

(56) References Cited

U.S. PATENT DOCUMENTS

2010/0290706 A1* 11/2010 Wang ............... G06F 3/04883
                                                    382/188
2011/0054837 A1   3/2011 Ikeda
2011/0302267 A1  12/2011 Christensen
2011/0320481 A1  12/2011 Huang
2013/0046544 A1*  2/2013 Kay ................ G06F 3/04883
                                                    704/275

FOREIGN PATENT DOCUMENTS

| CN | 1779621 A | 5/2006 |
| --- | --- | --- |
| CN | 101232380 A | 7/2008 |
| CN | 101482777 A | 7/2009 |
| CN | 102004575 A | 4/2011 |
| CN | 102096488 A | 6/2011 |
| CN | 102292691 A | 12/2011 |
| WO | 2010/055375 A1 | 5/2010 |

OTHER PUBLICATIONS

Australian Office Action for Application No. 2013286471 dated Oct. 6, 2015.
International Search report for Application No. PCT/CN2013/078755 dated Oct. 17, 2013, and its English translation thereof.
Chinese Office Action for Application No. 201210231671.X dated Nov. 22, 2016, and an English concise explanation of relevance thereof.

* cited by examiner

CHARACTER INPUT METHOD AND APPARATUS

CROSS-REFERENCE TO RELATED APPLICATIONS

This application is a continuation of International Application No. PCT/CN2013/078755 filed on Jul. 3, 2013. This application claims the benefit and priority of Chinese Application No. 201210231671.X, filed Jul. 5, 2012. The entire disclosures of each of the above applications are incorporated herein by reference.

FIELD

The present disclosure relates to a character input method and apparatus.

BACKGROUND

This section provides background information related to the present disclosure which is not necessarily prior art.

During use of various browsers/servers (B/S) and clients/servers (C/S), a user generally needs to input character strings such as a username and password to confirm his user identity. To protect the username and password from being easily hacked, the user needs to set a strong password to assure the security of user information. Generally, a strong password is a password which is the length of at least 8 characters and which at least contains characters from three of the following four categories: uppercase letters, lowercase letters, digits, and symbols on the keyboard (such as: !, $, or #).

Presently, for palm devices such as mobile phones, there are generally two kinds of character input keyboards: nine-patch input keyboards and full keyboard input keyboards are used.

FIG. 1 is a diagram illustrating a layout of characters on a nine-patch input keyboard. As shown in FIG. 1, on the keyboard, 26 letters are distributed on numeric keys. In addition, there is a switch key on the keyboard. The switch key is used to switch to a special symbol input interface. When a user uses the keyboard to input character information such as a username and password, he may input corresponding digits and letters by multiple taps, then switch to the special symbol input interface by using the switch key, input corresponding special symbols, and then switch back.

FIG. 2 is a diagram illustrating a layout of characters on a full keyboard input keyboard. As shown in FIG. 2, the keyboard includes a keyboard interface on which 26 letters are distributed and a keyboard interface on which special symbols and digits are distributed. The user may switch between the two keyboard interfaces by using switch keys on the two keyboard interfaces so as to input character information such as the username and password.

SUMMARY

This section provides a general summary of the disclosure, and is not a comprehensive disclosure of its full scope or all of its features.

One aspect of the various embodiments of the present disclosure is to provide a character input method. The character input method includes the following:

receiving key press information input by a user;

entering into a mapping mode when the received key press information meets a preset enabling condition of the mapping mode;

receiving key press information input by the user in the mapping mode; and searching a character string corresponding to the key press information input by the user in the mapping mode according to a preset mapping relation between the character string and a keyboard, and sending the searched character string to an application.

Another aspect of the various embodiments of the present disclosure is to provide a character input apparatus which includes the following:

a processor;

a memory which is to store computer readable instructions that when executed by the processor cause the processor to do the following:

receive key press information input by a user;

enter into a mapping mode when the received key press information meets a preset enabling condition of the mapping mode;

receive key press information input by the user in the mapping mode; and search a character string corresponding to the key press information input by the user in the mapping mode according to a preset mapping relation between the character string and a keyboard, and input the searched character string.

Another aspect of the various embodiments of the present disclosure is to provide a storage medium. The computer executable instructions control a computer to execute the character input method.

As found in the various embodiments of the present disclosure, after key press information of enabling the mapping mode defined by the user in advance is received and the mapping mode is entered into, key press information input by the user in the mapping mode is received, a character string corresponding to a pressed key according to a mapping relation between the character string and keys, and the character string is sent to the application to complete the character input process. During the entire character string input process, the user may carry out the input of a relatively long character string by only entering into the mapping mode and clicking on a key mapped to the sent character string. In this way, it is very convenient to operate keys, fewer keys are clicked, and a mistake is not likely to be made.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

For a better understanding of the present disclosure, reference should be made to the Detailed Description below, in conjunction with the following drawings in which like reference numerals refer to corresponding parts throughout the figures.

Corresponding reference numerals indicate corresponding parts throughout the several views of the drawings.

DETAILED DESCRIPTION

Example embodiments will now be described more fully with reference to the accompanying drawings.

To make the objectives, technical solutions, and advantages of the present disclosure more clear, the present invention will be further described in detail with reference to the attached drawings. It should be understood that the detailed embodiments described herein are only used for illustration and should not be construed as limitations to the present disclosure.

Figure 1:
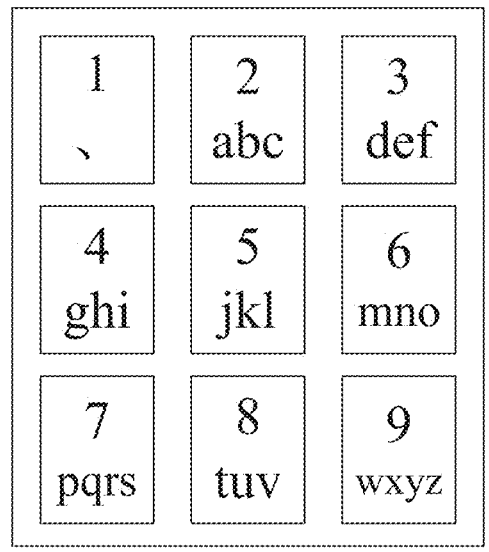
FIG. 1 is a diagram illustrating a layout of characters on a nine-patch input keyboard in the traditional art.
Figure 2:
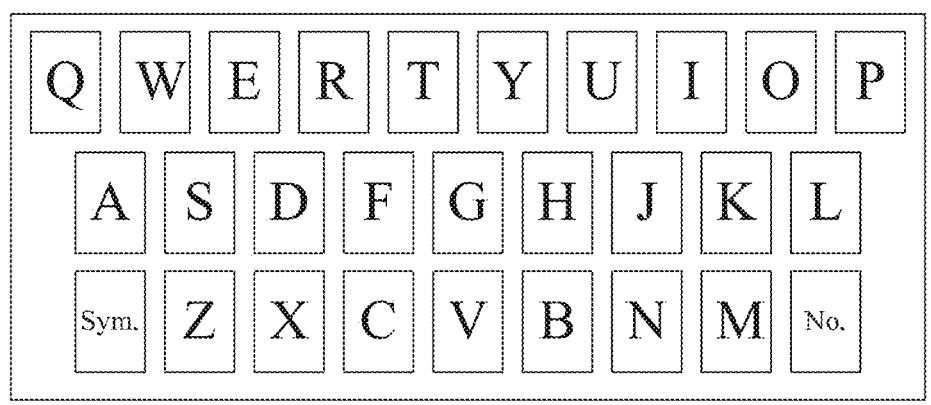
FIG. 2 is a diagram illustrating a layout if characters on a full keyboard input keyboard in the traditional art.
Figure 3:
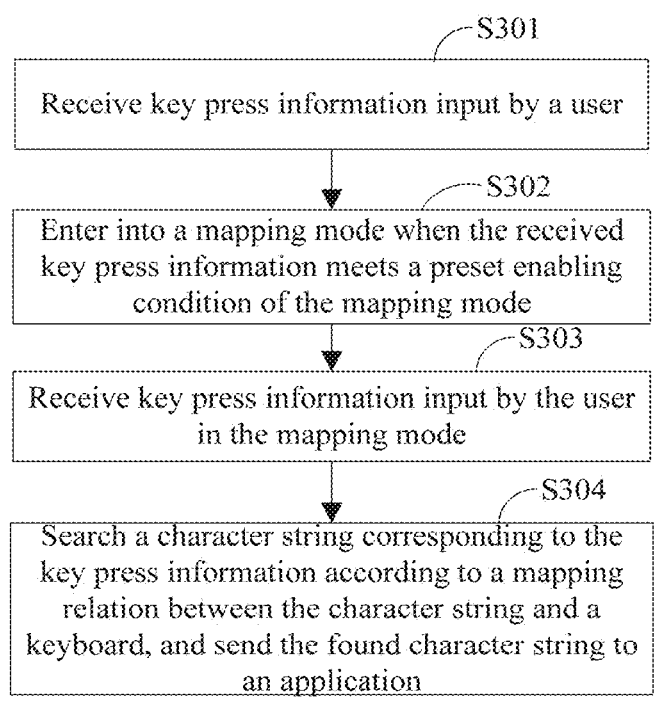
FIG. 3 is a flowchart to implement a character input method according to various embodiments of the present disclosure.

FIG. 3 is a diagram illustrating a flowchart of a character input method according to various embodiments of the present disclosure. As shown in FIG. 3, the character input method includes the following blocks.

Block S301: key press information input by a user is received.

Block S302: when the received key press information meets a preset enabling condition of a mapping mode, the mapping mode is entered.

The preset enabling condition of the mapping mode may be set according to specific situations of a terminal. For example, a key with an enabling function is newly added, or based on an original key, key press duration and key press frequency are defined, etc. The mapping mode herein refers to a mode where a combination of one or several keys corresponds to a character string, which will be further described in the following embodiments.

Block S303: key press information input by the user in the mapping mode is received.

Block S304: a character string corresponding to the key press information is searched according to a preset mapping relation between the character string and a keyboard, and the character string is sent to the application.

When the received key press information input by the user meets the preset enabling condition of the mapping mode, the mapping mode is entered into after the key press information which enables the mapping mode preset by the user is received. The user may enter into the mapping mode by the defined enabling way and then input key press information, and after the key press information input by the user in the mapping mode is received, according to the preset mapping relation between the character string and the keyboard, the character string corresponding to the key is searched and the character string is sent to the application so as to complete the input of the character string.

Since the foregoing entire character information input process may be carried out by only entering into the mapping mode and clicking on a key mapped to a character string, regardless of how long a character string is or how complex character information contained in a character string is, once the mapping mode is defined, it is very convenient for the user to carry out input and avoid making a mistake, which improves the convenience of use by the user.

Figure 4:
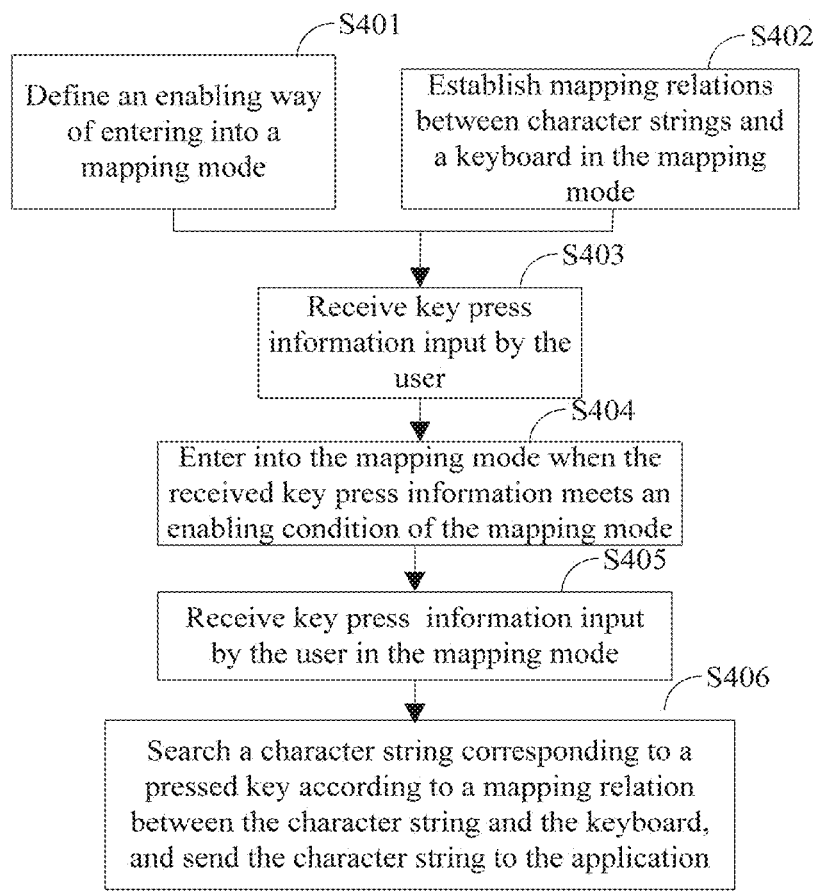
FIG. 4 is a flowchart to implement a character input method according to various embodiments of the present disclosure.

FIG. 4 is a diagram illustrating a flowchart of a character input method according to various embodiments of the present disclosure. As shown in FIG. 4, the detailed process of the method may be as follows.

Block S401: an enabling way of entering into a mapping mode is defined.

According to various embodiments, the enabling way of entering into the mapping mode may be defined flexibly. For terminals with a physical keyboard such as various mobile phones with a keyboard, whether to enter into the mapping mode may be defined by defining key press duration. For touch screen terminals such as various touch intelligent mobile phones and PAD devices, a new function key may be added to an existing key interface to enable the mapping mode, which is convenient for the user to user without affecting definitions of existing keyboard functions.

Block S402: mapping relations between character strings and a keyboard in the mapping mode are established.

According to various embodiments, block S401 and block S402 have no particular orders. As described in block S401, for a terminal with a physical keyboard, in the mapping mode, mapping relations between the physical keyboard and the character strings are established, for example establishing a mapping relation between letter A and 1234ABC!@#, establishing a mapping relation between letter B and EFG$%^4321, etc., as shown in the following table:

| Keyboard key | Character String |
| --- | --- |
| A | 1234ABC!@# |
| B | EFG$%^4321 |
| ... | ... |

The established mapping relations are stored by way of an encrypted file to improve the security of user information. For a touch screen terminal, an existing key may be defined or a new key may be established to carry out the corresponding mapping relations.

Block S403: key press information input by the user is received.

Block S404: when the received key press information meets a preset enabling condition of the mapping mode, the mapping mode is entered into.

Block S405: key press information input by the user under the mapping mode is received.

Block S406: a character string corresponding to a pressed key is searched according to a mapping relation between the character string and the keyboard, and the character string is sent to the application.

After the user completes a press-and-bounce operation for the key of the enabling way, the mapping mode is exited automatically.

According to the above blocks, the key press information input by the user in the mapping mode may be information about a physical key or may be information about a key customized by the user. When the user uses the mapping mode, he may first customize character strings corresponding to keys, and when he actually inputs a username or password, no matter how long and how complex a character string of the account or the password is, he may carry out the input of it by only switching to the mapping mode and clicking on a corresponding single key.

According to various embodiments, an enabling way for entering into the mapping mode defined according to the present embodiment includes the following process.

A certain key is defined as an enabling key of the mapping mode. Triggering information of the enabling key is monitored. The triggering information of the enabling key is received. It is determined whether an interval between a time point of triggering enabling of the mapping mode this time and a time point of entering into the mapping mode previous Nth time is smaller than a second set time value. If yes, then the mapping mode is entered into; or otherwise the triggering information of the enabling key continues to be monitored. The "certain key" herein may be that for a terminal with a physical keyboard, the "certain key" may be any key on the physical keyboard, and for a touch screen terminal, the "certain key" may be any key on an original touch keyboard or may be a newly added specific enabling key by modifying the layout of the touch keyboard, which makes the user's operation more intuitive.

Accordingly, when an existing key on the original keyboard is defined as the enabling key of the mapping mode, a triggering way of the key should be different from a triggering way of a common key and may be defined in triggering time and triggering frequency aspects; and for a newly added enabling key, a triggering way of the key may be defined according to a triggering way of the common key.

Figure 5:
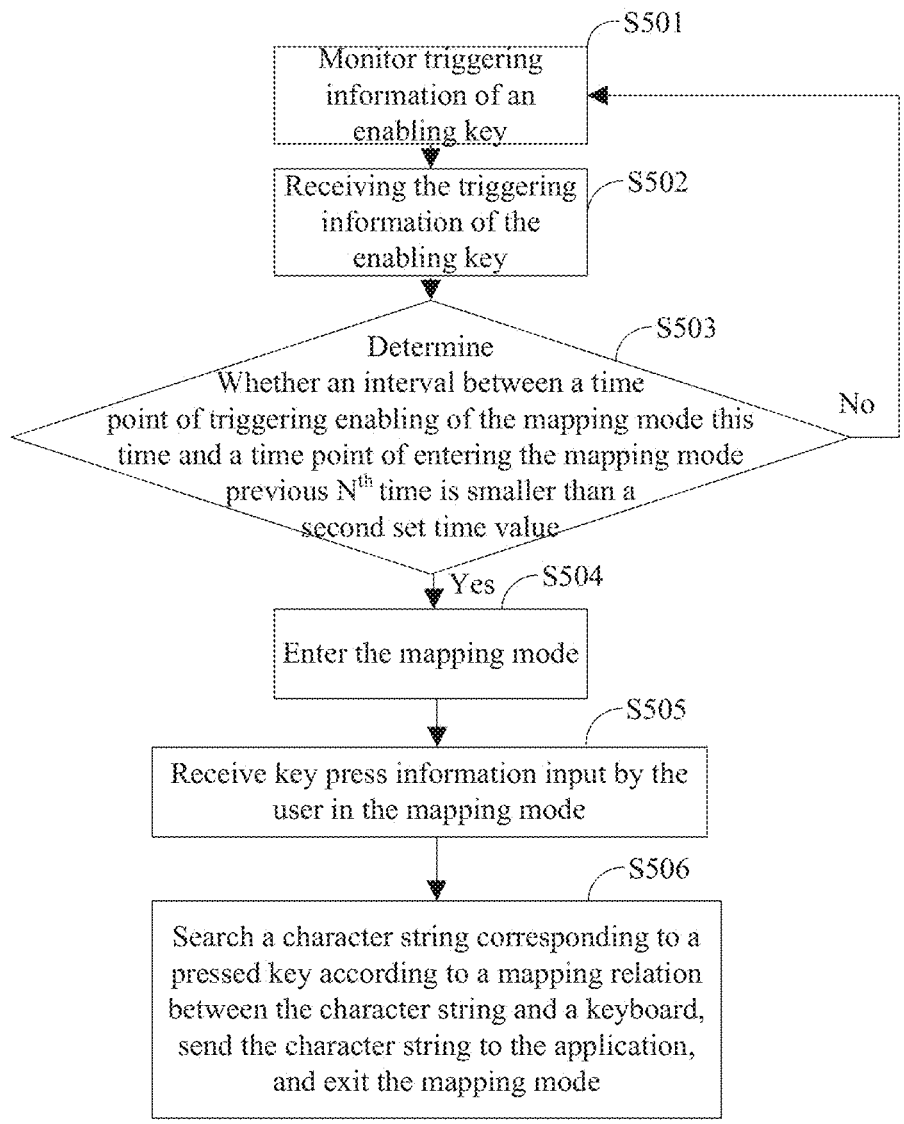
FIG. 5 is a flowchart to implement a character input method according to various embodiments of the present disclosure.

FIG. 5 is a diagram illustrating a flowchart of a character input method according to various embodiments of the present disclosure. As shown in FIG. 5, the method includes the following blocks.

Block S501: triggering information of an enabling key is monitored. For the enabling key for entering into the mapping mode defined according to various embodiments, the triggering information of the enabling key needs to be monitored during use by the user.

Block S502: the triggering information of the enabling key is received. According to a predefined triggering requirement, when the enabling key meets the triggering requirement, the triggering information of the enabling key is generated.

Block S503: it is determined whether an interval between a time point of triggering enabling of the mapping mode this time and a time point of entering into the mapping mode previous Nth time is smaller than a second set time value. If the time point of triggering enabling of the mapping mode this time and the time point of entering into the mapping mode previous Nth time is smaller than the second set time value, then block S504 is executed to enter into the mapping mode, or otherwise, block S501 is returned to continue to monitor the triggering information of the enabling key.

Both the "time point of entering into the mapping mode previous Nth time" and the "second set time value" may be set by the user or by a manufacturer according to the level of security. For example, if the Nth time is the third time and the second set time value is 1 minute, then this indicates that the time point of triggering enabling of the mapping mode this time and a time point of entering into the mapping mode a third time should be smaller than the second set time value, 1 minute.

Block S505: key press information input by the user in the mapping mode is received.

Block S506: a character string corresponding to a pressed key is searched according to a mapping relation between the character string and a keyboard, the character string is sent to the application, and the mapping mode is exited.

When the mapping mode is entered into, the password or account defined by the user corresponds to a simple key. By setting that each time a character string is sent out in the mapping mode, the mapping mode is exited, and setting a number of times the mapping mode allows to be entered into at most during a specific time period. For example, in the above example, 3 times may be entered into at most during 1 minute and the difficulty of obtaining a defined character string by an abnormal user may be increased. This is particularly important for some character strings defined by the user, especially password information.

An enabling way of the mapping mode defined corresponding to a character input method according to various embodiments may include the following process. Any key on an original character keyboard is defined as an enabling key of the mapping mode. Key press duration of the enabling key on the original character keyboard is monitored. If the key press duration is larger than a first set time value, then the mapping mode is enabled; or otherwise, the triggering information of the enabling key continues to be monitored, and a character corresponding to the enabling key on the original character keyboard is sent to the application.

Figure 6:
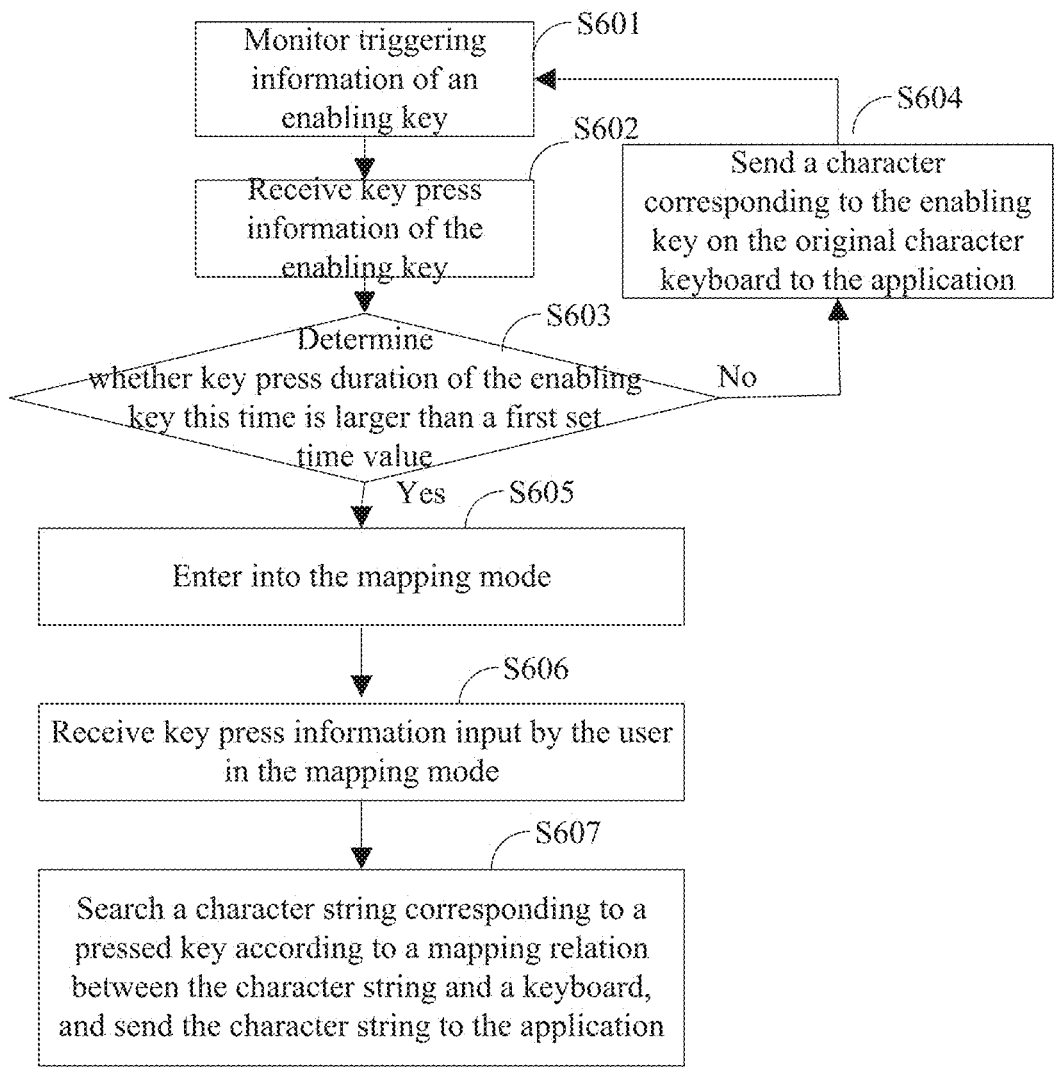
FIG. 6 is a flowchart to implement a character input method according to various embodiments of the present disclosure.

FIG. 6 is a diagram illustrating a flowchart of a character input method according to various embodiments of the present disclosure. As shown in FIG. 6, the method includes the following process.

Block S601: triggering information of an enabling key is monitored.

Block S602: key press information of the enabling key is received.

Block S603: it is determined whether key press duration of the enabling key this time is larger than a first set time value, and if the key press duration of the enabling key this time is larger than the first set time value, then block S605 is executed to enter into the mapping mode; or otherwise, block S604 is executed to send a character corresponding to the enabling key on the original character keyboard to the application and block S601 is returned to in order to continue to monitor the triggering information of the enabling key.

The foregoing blocks in the various embodiments are mainly in reference to the case that no new key is added, based on the original character keyboard, and an existing key is defined as the enabling key of entering into the mapping mode. By setting a certain key on the original character keyboard as the enabling key and monitoring key press duration of the certain key, the mapping mode is entered into only when the key press duration is larger than the first set time value such as 3 seconds (the set time value should not conflict with functions of normal input of the keyboard). In this way, the method in the various embodiments may be carried out based on an existing keyboard, and may be used on a terminal using physical key input or on a terminal using touch key input.

The blocks S606 and S607 after the mapping mode is entered into are the same as the blocks S405 and S406 in the second embodiment, which will not be repeatedly described herein.

According to various embodiments, the "space" key on the original character keyboard is defined as the enabling key of the mapping mode, and the first set time value is set to be 3 seconds in advance. After the user presses the "space" key in the input mode, a key press duration monitoring function determines whether the key press duration is larger than 3 seconds, and if the key press duration is larger than 3 seconds, then the mapping mode is entered into, or otherwise, a space character is sent to the application. In the mapping mode, after a key is triggered, a character string mapped to the key is sent to the application and the mapping mode is exited.

Figure 7:
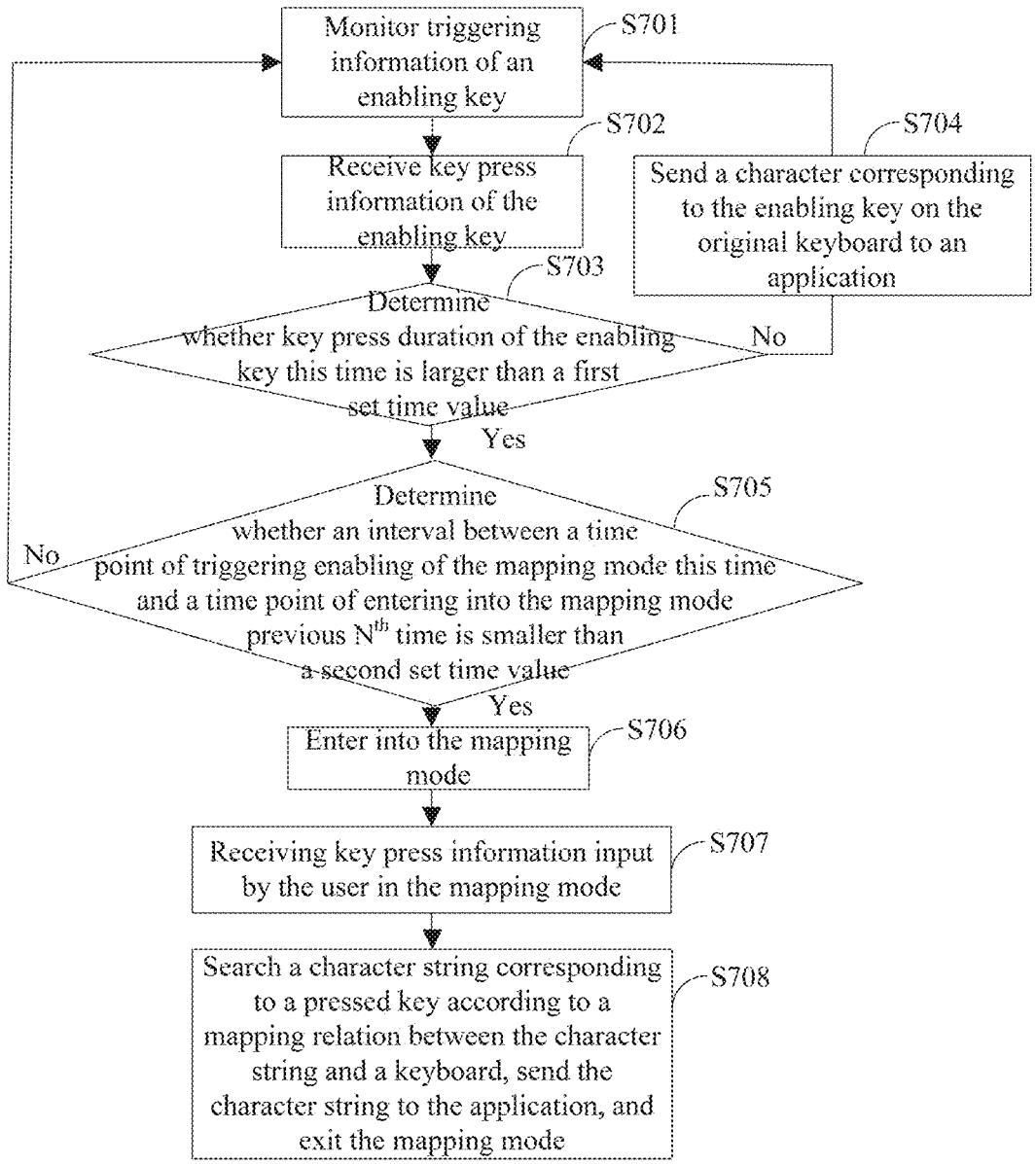
FIG. 7 is a flowchart to implement a character input method according to various embodiments of the present disclosure.

FIG. 7 is a diagram illustrating a flowchart of a character input method according to various embodiments of the present disclosure. As shown in FIG. 7, the method includes the following blocks.

Block S701: triggering information of an enabling key is monitored.

Block S702: key press information of the enabling key is received.

Block S703: it is determined whether key press duration of the enabling key this time is larger than a first set time value, and if the key press duration this time is not larger than the first set time value, then block S704 is executed to send a character corresponding to the enabling key on the original character keyboard to the application and block S701 is returned to in order to continue to monitor the triggering information of the enabling key; or otherwise block S705 is executed to determine whether an interval between a time point of triggering enabling of the mapping mode this time and a time point of entering into the mapping mode previous Nth time is smaller than a second set time value, and if the interval between the time point of triggering enabling of the mapping mode this time and the time point of entering into the mapping mode previous Nth time is smaller than the second set time value, then block S706 is executed to enter into the mapping mode, or otherwise block S701 is returned to in order to continue to monitor the triggering information of the enabling key, and prompt that the operation is too frequent.

Blocks S707 and S708 after the mapping mode is entered into are the same with the blocks S505 and S506 in the various embodiments, which will not be repeatedly described.

By defining the press duration of the enabling key, the mapping mode may be entered into via the original character keyboard without conflicting with normal input of characters, and by limiting the frequency of entering into the mapping mode, the security of user information is improved.

Figure 8:
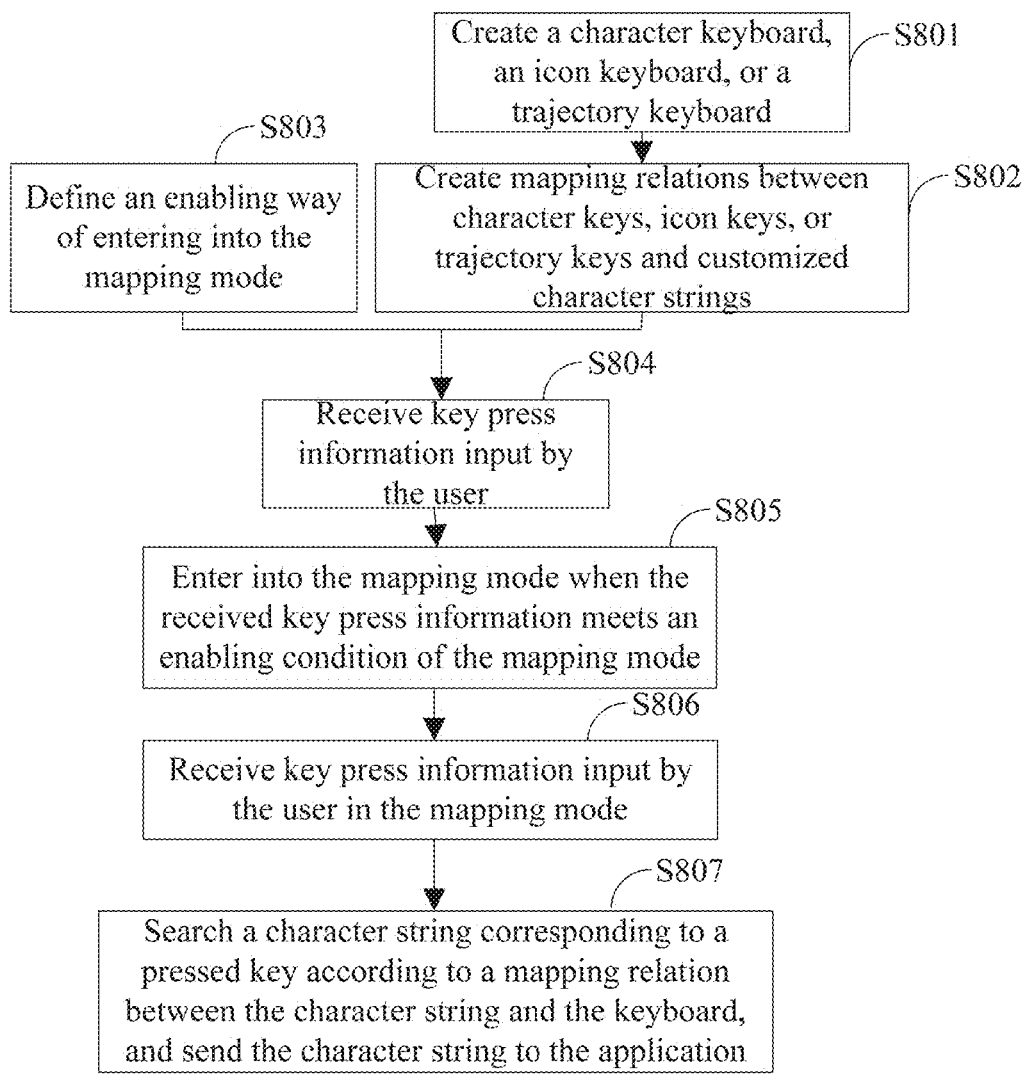
FIG. 8 is a flowchart to implement a character input method according to various embodiments the present disclosure.

FIG. 8 is a diagram illustrating a flowchart of a character input method according to various embodiments of the present disclosure. As shown in FIG. 8, the method includes the following blocks.

Blocks S801 and S802: mapping relations between character strings and a keyboard is established in a mapping mode.

Block S801: in the mapping mode, a character keyboard, an icon keyboard, or a trajectory keyboard is created.

According to requirements of a user, the user may create various kinds of keyboards such as a character keyboard, an icon keyboard, and a trajectory keyboard.

Block S802: mapping relations between character keys, icon keys, or trajectory keys and customized character strings are created.

The user may define the mapping relations for the keys on the created keyboards according to his use habits. For example, for an e-mail account password, a mapping relation may be established between an icon with e-mail identification and a password or an account, which is convenient for the user to operate.

Block S803: an enabling way of entering into the mapping mode is defined.

According to the various embodiments, the enabling way of entering into the mapping mode may be the enabling way of entering into the mapping mode in the various embodiments. Blocks S804, S805, S806, and S807 are similar to blocks S403, S404, S405, and S406, which will not be elaborated herein.

Figure 9:
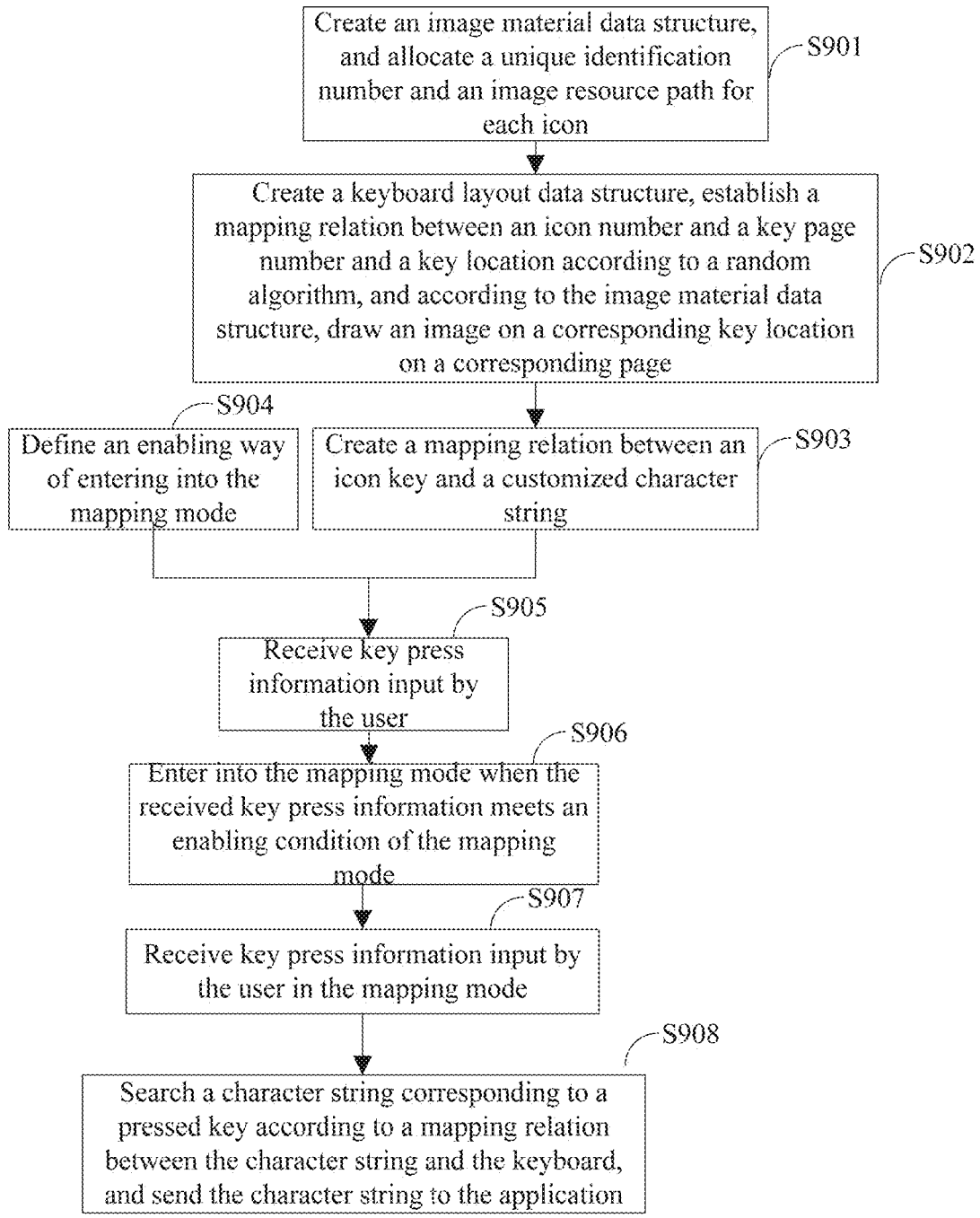
FIG. 9 is a flowchart to implement a character input method according to various embodiments of the present disclosure.

FIG. 9 is a diagram illustrating a flowchart of a character input method according to various embodiments of the present disclosure. As shown in FIG. 9, the method may include the following.

Creating an icon key in the mapping mode includes blocks S901, S902, and S903.

Block S901: an image material data structure is created and a unique identification number and an image resource path are allocated for each icon.

Block S902: a keyboard layout data structure is created, a mapping relation between an icon number and a key page number and a key location is established according to a random algorithm, and according to the image material data structure, an image is drawn on a corresponding key location on a corresponding page.

Block S903: a mapping relation between the icon key and a customized character string is created.

Figure 12:
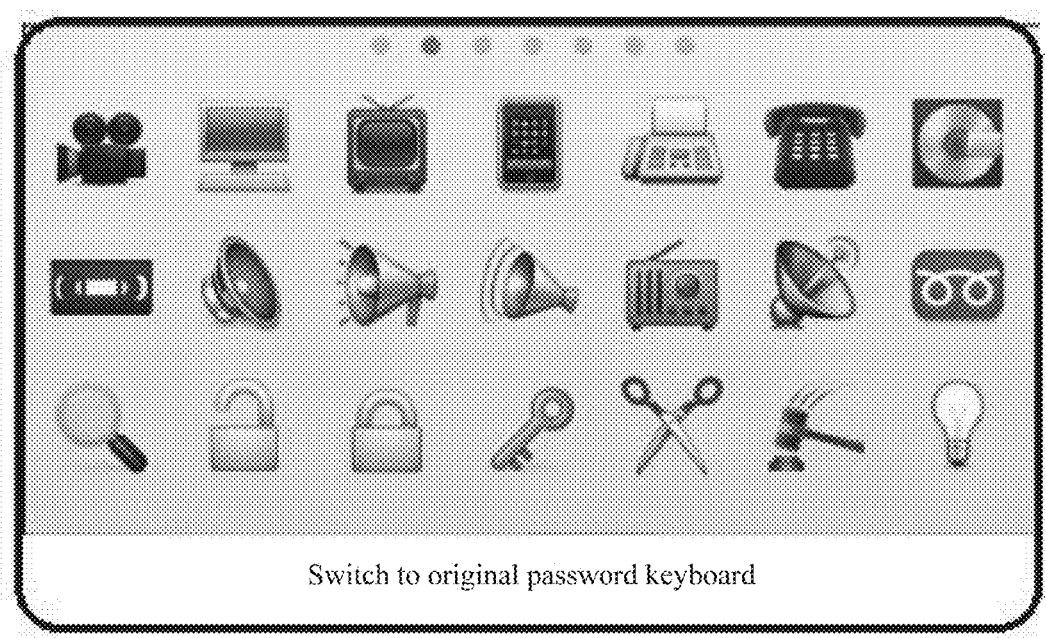
FIG. 12 is a diagram illustrating a character input implementation interface according to various embodiments of the present disclosure.

FIG. 12 is a diagram illustrating a character input implementation interface according to various embodiments of the present disclosure. Assuming that there are 70 built-in icons and customized icons, then in the keyboard layout, there are 4 pages of keyboards. On the first 3 pages, 21 icons are displayed on each page and nine icons are displayed on the last page. Each icon corresponds to a key. There is a switch key to switch back to an original character keyboard. There are two kinds of key icons. The first kind of key icons are icons built in the application. For example, the first icon on the first row in FIG. 12 is a camera, then the user may set it as a password corresponding to a camera or an album to facilitate memorization. The other kind of key icons are icons customized by the user from images in the album.

As shown in FIG. 12, each page of keyboard includes three parts: dots on the top, which represents page numbers of all icons, and in which a deep-colored dot represents a current page number;

an icon area, which represents random icons on a current page; and a bottom, which is a keyboard switch button, and through which an original character keyboard may be switched to.

First, an image resource data structure, Icon ([IconID, iconSrc]), is created, where IconID is an unique identification to identify a certain image icon, and iconSrc represents an image resource path.

Then, a keyboard layout data structure, Keylayout([pagecode, keycode, IconID]) is created, where pagecode is a page number of a current icon keyboard, keycode represents a key location value, and IconID uniquely identifies a certain image. By using a random algorithm, mapping between a certain IconID and a pagecode and a keycode is established, so as to establish a Keylayout array. According to the Keylayout array and the image resource array, a corresponding image is drawn on a corresponding key location.

Mapping relations between icon keys and customized character strings are created, and the mapping relations are stored as an encrypted file. The mapping relations may be shown as the following table.

| IconID | Character String |
|--------|------------------|
| IconID1 | 123ABC!@# |
| ... | ... |

According to various embodiments, the enabling way of entering into the mapping mode may use the enabling way of entering into the mapping mode in any of the various embodiments. Blocks S904, S905, S906, S907, and S908 are the same as blocks S803, 804, S805, S806, and S807, which will not be elaborated herein.

Figure 10:
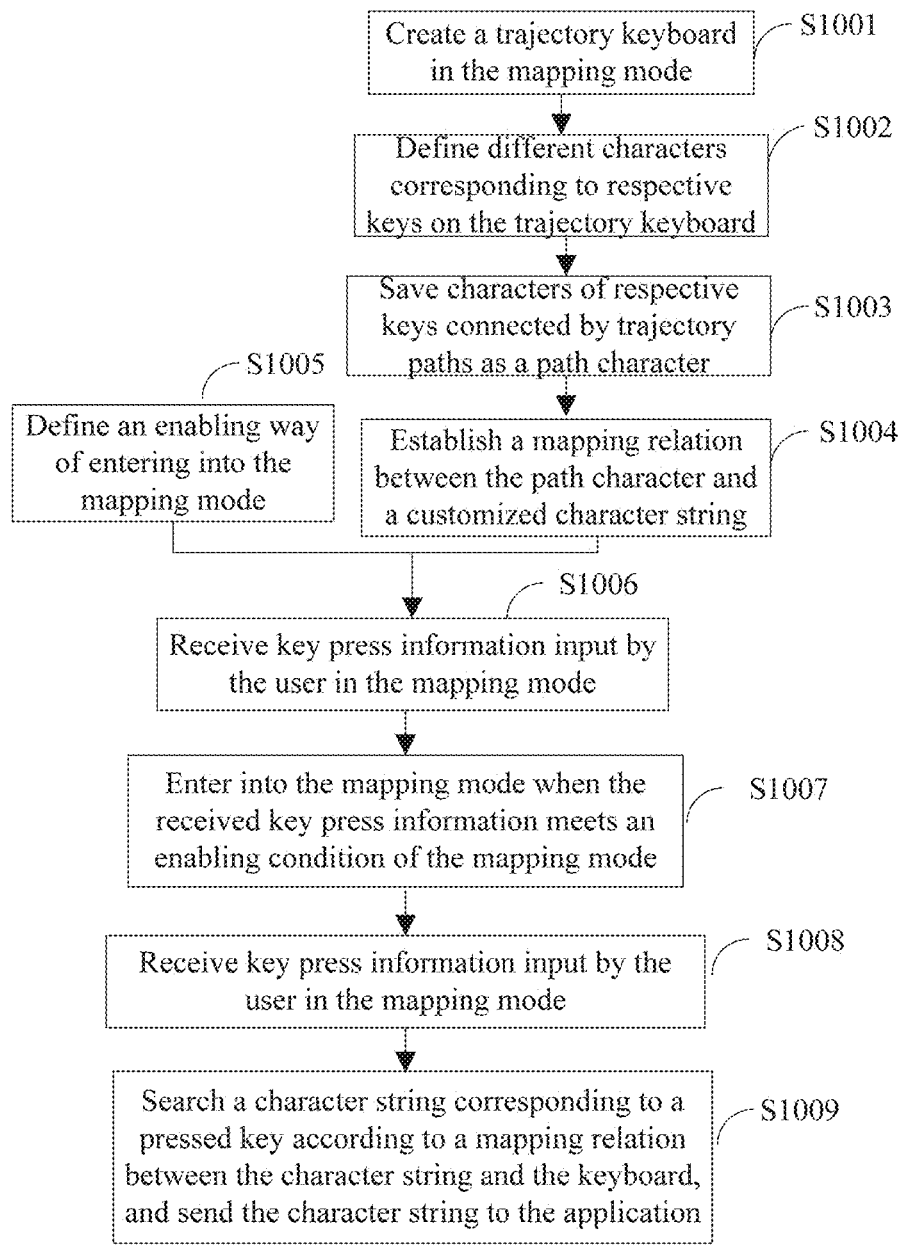
FIG. 10 is a flowchart to implement a character input method according to various embodiments of the present disclosure.

FIG. 10 is a diagram illustrating a flowchart of a character input method according to various embodiments of the present disclosure. As shown in FIG. 10, the method includes the following blocks.

A block of creating an icon key in the mapping mode may include blocks S1001, S1002, S1003, and S1004.

Block S1001: a trajectory keyboard is created in the mapping mode.

Block S1002: different characters corresponding to respective keys on the trajectory keyboard are defined.

Block S1003: characters of respective keys connected by trajectory paths are saved as a path character.

Block S1004: a mapping relation between the path character and a customized character string is established.

Figure 13:
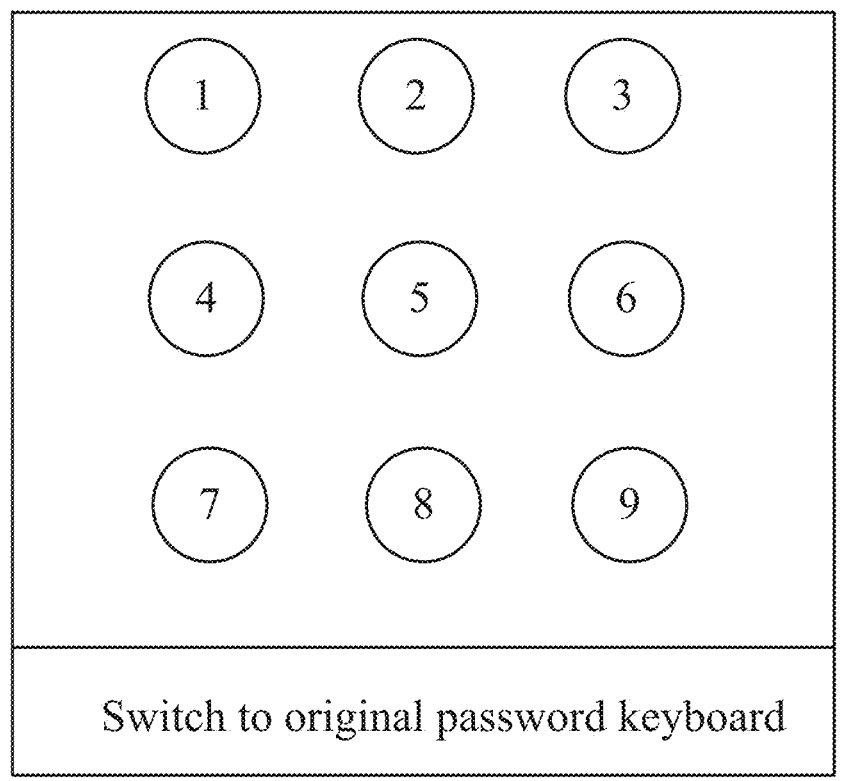
FIG. 13 is a diagram illustrating a character input implementation interface according to various embodiments of the present disclosure.

FIG. 13 is a diagram illustrating a character input implementation interface according to various embodiments of the present disclosure. In the mapping mode, a 3*3 dot array keyboard and a key (beneath the dot array keyboard) which is used to switch to an original character keyboard are created. The respective keys on the dot array keyboard from left to right and then from top to bottom correspond to numbers 1-9. The user may touch and connect array dots by a gesture (or using a keyboard with physical keys, though this is not that flexible as a touch terminal) to form a trajectory. Characters on the array dots are recorded according to their connection sequence, and recorded as a path character. A mapping relation between the path character and a customized character string is created by the user. For example, a mapping relation is established between the path character "654321" and the character string "ABC123!@#", and the mapping relation is encrypted and saved.

When the user enters into the mapping mode, he starts to draw a trajectory path, which is generally used on a touch screen terminal. When a certain dot array is touched as the start condition of the trajectory path, a path character begins to be recorded, and a trajectory origin is returned to or the touch ends as the termination condition of the trajectory path, for example, drawing a path character "654321". According to the recorded path character, a customized character string mapped to it is obtained: "ABC123!@#", the customized character string is sent to a current input box, and an original character keyboard interface is returned to.

According to various embodiments, the enabling way of entering into the mapping mode may use the enabling way of entering into the mapping mode in any of the various embodiments. Blocks S1005, S1006, S1007, S1008, and S1009 are similar to the blocks S803, S804, S805, S806, and S807 in the various embodiments, which will not elaborated herein.

Figure 11:
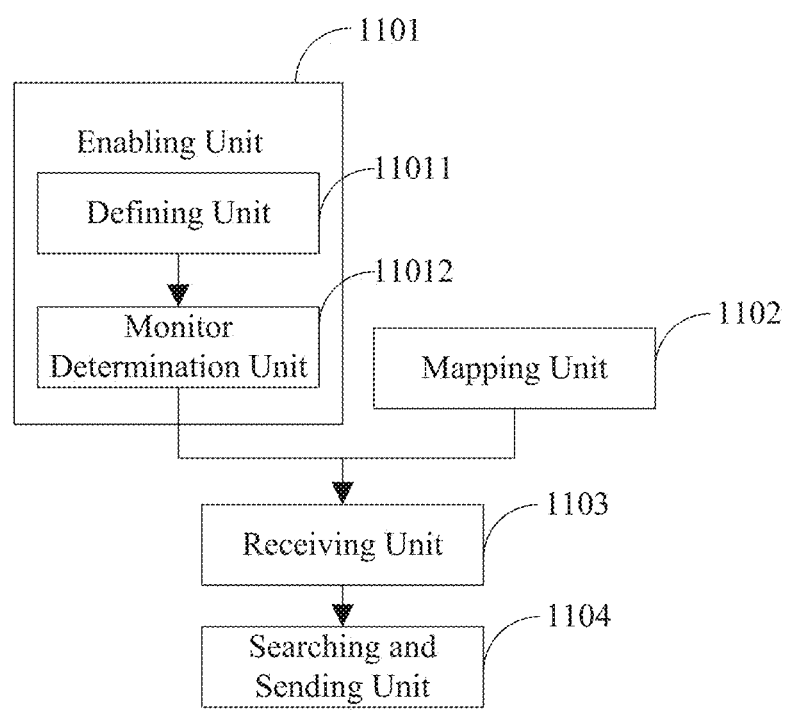
FIG. 11 is a connection diagram of a character input apparatus according to various embodiments of the present disclosure.

FIG. 11 is a diagram illustrating a structure of a character input apparatus according to various embodiments of the present disclosure. As shown in FIG. 11, the character input apparatus includes the following:

a receiving unit 1103 configured to receive key press information input by a user;

an enabling unit 1101 configured to define an enabling way of entering into a mapping mode, and enter into the mapping mode when the received key press information meets an enabling condition of the mapping mode;

a mapping unit 1102 configured to establish mapping relations between character strings and a keyboard; and a searching and sending unit 1104 configured to search a character string corresponding to a pressed key according to the mapping relations between the character strings and the keyboard, and send the character string to an application.

The enabling unit 1101 configured to define the enabling way of entering into the mapping mode includes the following:

a defining unit 11011 configured to define a certain key as an enabling key of the mapping mode; and a monitor determination unit 10012 configured to monitor triggering information of the enabling key, and after receive the triggering information of the enabling key, determine whether an interval between a time point of triggering enabling of the mapping mode this time and a time point of entering into the mapping mode previous Nth time is smaller than a second set time value.

If the interval between the time point of triggering enabling of the mapping mode this time and the time point of entering into the mapping mode previous Nth time is smaller than the second set time value, the monitor determination unit 10012 determines to enter into the mapping mode, or otherwise the monitor determination unit 10012 determines not to enter into the mapping mode.

A terminal electronic device including the foregoing character input apparatus is further provided according to an embodiment of the present disclosure.

In various embodiments of the present disclosure, by defining the enabling way of entering into the mapping mode and establishing mapping relations between character strings and a keyboard in the mapping mode, after the mapping mode is entered into, receiving key press information input by the user in the mapping mode, and finding a character string corresponding to a key according to the mapping relations between the character strings and keys; and sending the character string to the application, a character string input process is completed. During the entire character string input process, the user may carry out input of a relatively long character string by only entering into the mapping mode and clicking on a key mapped to the sent character string. In this way, it is very convenient to operate keys, fewer keys are clicked, and it is not likely to make a mistake.

The methods and apparatus provided according to the present disclosure may be implemented by hardware, computer readable instructions, or hardware combined with computer readable instructions. The computer readable instructions used in the present disclosure may be stored by multiple processors on a readable storage medium such as a hard disk, a CD-ROM, a DVD, an optic disk, a floppy disk, a magnetic tape, a RAM, a ROM, or other suitable storage devices. At least a part of the computer readable instructions may be replaced by specific hardware, for example, by a customized integrated circuit, a gate array, a FPGA, a PLD, a computer with a specific function, etc.

The computer readable storage medium provided according to the present disclosure is configured to store instructions which cause the apparatus or the device to execute the methods of the present disclosure. Specifically, the apparatus or the device provided according to the present disclosure has a storage medium, on which computer readable program codes carrying out the functions in any of the embodiments are stored, and the apparatus or the device (or a CPU or a MPU) is able to read out and execute the program codes stored on the storage medium.

In this case, the program codes read out from the storage medium may carry out the functions in any of the foregoing embodiments, and thus the program codes and the storage medium which stores the program codes constitute a part of the present disclosure.

The storage medium which provides the program codes may be a floppy disk, a hard disk, a magneto-optical disk, an optical disk (e.g., a CD-ROM, a CD-R, a CD-RW, a DVD-ROM, a DVD-RAM, a DVD-RW, or a DVD+RW), a magnetic disk, a flash card, or a ROM, etc. As an option, the program codes may be downloaded from a server through a communication network.

It is to be aware that for program codes that are executed by a computer, at least a part of operations carried out by the program codes may be carried out by an operating apparatus on the computer, so as to realize the technical solution in any of the foregoing embodiments, in which the computer executes instructions based on the program codes.

In addition, the program codes stored on the storage medium are written into a memory. The memory is located in an extension board plugged into a computer or in an extension unit connected with the computer. According to various embodiments, based on the instructions, a CPU on the extension board or on the extension unit executes at least a part of the operations so as to carry out the technical solution in any of the foregoing embodiments.

The foregoing is only an example of the present invention, and should not be construed as limitations to the present disclosure. Any modification, equivalent replacement, improvement and the like within the spirit and principle of the present invention should be contained in a protection scope of the implementation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A character input method, comprising:
    defining an enabling way of entering into the mapping mode;
    establishing the mapping relation between the character string and the keyboard in the mapping mode;
    receiving key press information input by a user;
    entering into a mapping mode in response to determining that the received key press information meets a preset enabling condition of the mapping mode, wherein the mapping mode is a mode in which a combination of one or several keys corresponds to character string;
    receiving key press information input by the user in the mapping mode; and
    searching for a character string corresponding to the key press information input by the user in the mapping mode according to a preset mapping relation between the character string and a keyboard, and inputting the character string found,
    wherein defining the enabling way of entering into the mapping mode comprises:
    defining a certain key as an enabling key of the mapping mode;
    monitoring triggering information of the enabling key;
    receiving the triggering information of the enabling key;
    determining whether an interval between a time point of triggering enabling of the mapping mode this time and a time point of entering into the mapping mode previous $N^{th}$ time before the time point of triggering enabling of the mapping mode this time is smaller than a second set time value, where N is a preset positive integer;
    and in response to determining that the interval between the time point of triggering enabling of the mapping mode this time and the time point of entering into the mapping mode previous $N^{th}$ time before the time point of triggering enabling of the mapping mode this time is smaller than the second set time value, then entering into the mapping mode;
    or otherwise, continuing to monitor the triggering information of the enabling key.

2. The character input method of claim 1, wherein establishing the mapping relation between the character string and the keyboard in the mapping mode comprises:
    creating a character keyboard, an icon keyboard, or a trajectory keyboard in the mapping mode; and
    creating mapping relations between character keys, icon keys, or trajectories and customized character strings, according to the created character keyboard, the icon keyboard, or the trajectory keyboard.

3. The character input method of claim 2, wherein creating an icon key in the mapping mode comprises:
    creating an image material data structure and allocating a unique identification number and an image resource path for each icon; and creating a keyboard layout data structure, establishing mapping between an identification number of an icon and a key page number and a key location according to a random algorithm, and drawing a corresponding image on a corresponding key location on a corresponding page.

4. The character input method of claim 2, wherein according to the created trajectory keyboard, creating a mapping relation between a trajectory and a customized character string comprises:
defining different characters corresponding to respective keys on the trajectory keyboard;
saving respective key characters connected by a trajectory path as a path character string; and
establishing mapping between the path character string and the customized character string.

5. The character input method of claim 1, wherein the character string comprises password or account information.

6. A character input method, comprising:
defining an enabling way of entering into the mapping mode;
establishing the mapping relation between the character string and the keyboard in the mapping mode;
receiving key press information input by a user;
entering into a mapping mode in response to determining that the received key press information meets a preset enabling condition of the mapping mode, wherein the mapping mode is a mode in which a combination of one or several keys corresponds to a character string;
receiving key press information input by the user in the mapping mode; and
searching for a character string corresponding to the key press information input by the user in the mapping mode according to a preset mapping relation between the character string and a keyboard, and inputting the character string found;
wherein defining the enabling way of entering into the mapping mode comprises:
defining a key on an original character keyboard as an enabling key of the mapping mode;
monitoring key press duration of the enabling key on the original character keyboard;
in response to determining that the key press duration is smaller than a first set time value, then continuing to monitor the triggering information of the enabling key and inputting a character corresponding to the enabling key on the original character keyboard; or
in response to determining that the key press duration is larger than the first set time value, determining whether an interval between a time point of entering into the mapping mode this time and a time point of entering into the mapping mode previous $N^{th}$ time before the time point of triggering enabling of the mapping mode this time is smaller than a second set time value, where N is a preset positive integer; and
in response to determining that the interval between the time point of entering into the mapping mode this time and the time point of entering into the mapping mode previous $N^{th}$ time before the time point of triggering enabling of the mapping mode this time is smaller than the second set time value, then entering into the mapping mode; or otherwise, prompting that an operation is too frequent and continuing to monitor the triggering information of the enabling key.

7. A character input apparatus, comprising:
a processor;
a memory on which is to store computer readable instructions that when executed by the processor cause the processor to:
define an enabling way of entering into the mapping mode;
establish the mapping relation between the character string and the keyboard in the mapping mode;
receive key press information input by a user;
enter into a mapping mode in response to determining that the received key press information meets a preset enabling condition of the mapping mode, wherein the mapping mode is a mode in which a combination of one or several keys corresponds to a character string;
receive key press information input by the user in the mapping mode; and
search for a character string corresponding to the key press information input by the user in the mapping mode according to a preset mapping relation between the character string and a keyboard, and input the character string found;
wherein when define the enabling way of entering into the mapping mode, the computer readable instructions further cause the processor to:
define a certain key as an enabling key of the mapping mode;
monitor triggering information of the enabling key;
receive the triggering information of the enabling key;
determine whether an interval between a time point of triggering enabling of the mapping mode this time and a time point of entering into the mapping mode previous $N^{th}$ time before the time point of triggering enabling of the mapping mode this time is smaller than a second set time value, where N is a preset positive integer;
and in response to determining that the interval between the time point of triggering enabling of the mapping mode this time and the time point of entering into the mapping mode previous $N^{th}$ time before the time point of triggering enabling of the mapping mode this time is smaller than the second set time value, then enter into the mapping mode;
or otherwise, continue to monitor the triggering information of the enabling key.

8. The character input apparatus of claim 7, wherein when establish the mapping relation between the character string and the keyboard in the mapping mode, the computer readable instructions further cause the processor to:
create a character keyboard, an icon keyboard, or a trajectory keyboard in the mapping mode; and
create mapping relations between character keys, icon keys, or trajectories and customized character strings, according to the created character keyboard, the icon keyboard, or the trajectory keyboard.

9. The character input apparatus of claim 8, wherein when create an icon key in the mapping mode, the computer readable instructions further cause the processor to:
create an image material data structure and allocate a unique identification number and an image resource path for each icon; and
create a keyboard layout data structure, establish mapping between an identification number of an icon and a key page number and a key location according to a random algorithm, and draw a corresponding image on a corresponding key location on a corresponding page.

10. The character input apparatus of claim 8, wherein when according to the created trajectory keyboard, creating a mapping relation between a trajectory and a customized character string, the computer readable instructions further cause the processor to:

- define different characters corresponding to respective keys on the trajectory keyboard;
- save respective key characters connected by a trajectory path as a path character string; and
- establish mapping between the path character string and the customized character string.

11. A character input apparatus, comprising:
a processor;
a memory on which is to store computer readable instructions that when executed by the processor cause the processor to:
- define an enabling way of entering into the mapping mode;
- establish the mapping relation between the character string and the keyboard in the mapping mode;
- receive key press information input by a user;
- enter into a mapping mode in response to determining that the received key press information meets a preset enabling condition of the mapping mode, wherein the mapping mode is a mode in which a combination of one or several keys corresponds to a character string;
- receive key press information input by the user in the mapping mode; and
- search for a character string corresponding to the key press information input by the user in the mapping mode according to a preset mapping relation between the character string and a keyboard, and input the character string found;

wherein when defining the enabling way of entering into the mapping mode, the computer readable instructions further cause the processor to:
- define a key on an original character keyboard as an enabling key of the mapping mode;
- monitor key press duration of the enabling key on the original character keyboard;
- in response to determining that the key press duration is smaller than a first set time value, then continue to monitor the triggering information of the enabling key and input a character corresponding to the enabling key on the original character keyboard; or
- in response to determining that the key press duration is larger than the first set time value, determine whether an interval between a time point of entering into the mapping mode this time and a time point of entering into the mapping mode previous $N^{th}$ time before the time point of triggering enabling of the mapping mode this time is smaller than a second set time value, where N is a preset positive integer; and
- in response to determining that the interval between the time point of entering into the mapping mode this time and the time point of entering into the mapping mode previous $N^{th}$ time before the time point of triggering enabling of the mapping mode this time is smaller than the second set time value, then enter into the mapping mode; or otherwise, prompt that an operation is too frequent and continue to monitor the triggering information of the enabling key.

12. A storage medium configured to store computer executable instructions; the computer executable instructions being configured to control a computer to execute a character input method which comprises:
- defining an enabling way of entering into the mapping mode;
- establishing the mapping relation between the character string and the keyboard in the mapping mode;
- receiving key press information input by a user;
- entering into a mapping mode in response to determining that the received key press information meets a preset enabling condition of the mapping mode, wherein the mapping mode is a mode in which a combination of one or several keys corresponds to a character string;
- receiving key press information input by the user in the mapping mode; and
- searching for a character string corresponding to the key press information input by the user in the mapping mode according to a preset mapping relation between the character string and a keyboard, and inputting the character string found;

wherein defining the enabling way of entering into the mapping mode comprises:
- defining a key on an original character keyboard as an enabling key of the mapping mode;
- monitoring key press duration of the enabling key on the original character keyboard;
- in response to determining that the key press duration is smaller than a first set time value, then continuing to monitor the triggering information of the enabling key and inputting a character corresponding to the enabling key on the original character keyboard; or
- in response to determining that the key press duration is larger than the first set time value, determining whether an interval between a time point of entering into the mapping mode this time and a time point of entering into the mapping mode previous $N^{th}$ time before the time point of triggering enabling of the mapping mode this time is smaller than a second set time value, where N is a preset positive integer; and
- in response to determining that the interval between the time point of entering into the mapping mode this time and the time point of entering into the mapping mode previous $N^{th}$ time before the time point of triggering enabling of the mapping mode this time is smaller than the second set time value, then entering into the mapping mode; or otherwise, prompting that an operation is too frequent and continuing to monitor the triggering information of the enabling key.

* * * * *